United States Patent
Toh et al.

(10) Patent No.: US 8,027,463 B2
(45) Date of Patent: Sep. 27, 2011

(54) FIXED TELEPHONE SET CAPABLE OF PREVENTING HOWLING AND TEMPERATURE RISE OF A HANDSET

(75) Inventors: Tadamine Toh, Kanagawa (JP); Masaru Kunii, Kanagawa (JP); Jun Tamatsu, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 241 days.

(21) Appl. No.: 12/391,903

(22) Filed: Feb. 24, 2009

(65) Prior Publication Data

US 2009/0220069 A1    Sep. 3, 2009

(30) Foreign Application Priority Data

Feb. 29, 2008  (JP) ................... 2008-049123

(51) Int. Cl.
*H04M 1/00* (2006.01)
*H04M 9/00* (2006.01)
(52) U.S. Cl. ................. 379/428.01; 379/433.01

(58) Field of Classification Search .......... 379/419, 379/420.01–420.04, 428.01, 428.02, 428.04, 379/433.01, 433.04, 433.06, 433.07, 441, 379/447, 449; 455/575.1, 90.3
See application file for complete search history.

(56) References Cited

U.S. PATENT DOCUMENTS

2006/0046793 A1 *  3/2006  Hamilton et al. .......... 455/575.1

FOREIGN PATENT DOCUMENTS

| JP | 2-38847 A | 3/1990 |
|---|---|---|
| JP | 4-48763 A | 4/1992 |
| JP | 1995123139 A | 5/1995 |
| JP | 2004235736 A | 8/2004 |
| JP | 2005012364 A | 1/2005 |
| JP | 2006033534 A | 2/2006 |
| JP | 2006186729 A | 7/2006 |

OTHER PUBLICATIONS

Japanese Office Action for JP2008-049123 issued Aug. 3, 2011.

* cited by examiner

*Primary Examiner* — Tuan Nguyen

(57) ABSTRACT

The cradle and the telephone body are configured to be separable from and couplable to each other. The cradle and the telephone body are coupled to each other with a space interposed therebetween.

7 Claims, 2 Drawing Sheets

FIXED TELEPHONE SET CAPABLE OF PREVENTING HOWLING AND TEMPERATURE RISE OF A HANDSET

This application is based upon and claims the benefit of priority from Japanese patent application No. 2008-049123, filed on Feb. 29, 2008, the disclosure of which is incorporated herein in its entirety by reference.

BACKGROUND OF THE INVENTION

This invention relates to a fixed telephone set such as an IP (Internet Protocol) telephone set and, in particular, relates to a button telephone set.

Generally, this type of fixed telephone set, particularly, a button fixed telephone set, comprises a telephone body, a handset, and a cradle. The telephone body has dial keys, one-touch keys, a hold key, and so on. The cradle supports the handset. In such a button fixed telephone set, the cradle is provided with, in addition to a support portion for supporting the handset, a loudspeaker, a hook switch, and so on.

Japanese Unexamined Patent Application Publication (JP-A) No. Hei 07-123139 discloses a fixed telephone set that allows achieving a hold function by hanging a handset on a cradle, i.e. without providing a hold key on a telephone body (related art 1).

Japanese Unexamined Patent Application Publication (JP-A) No. 2005-12364 discloses a fixed telephone set that allows making a call by removing a handset with a microphone from a cradle (related art 2). In the related art 2, it is possible to suspend a telephone conversation with a communication partner by stopping sending audio signals, output from the microphone, to the communication partner depending on whether or not a user is close to the handset. As a result, it is possible to shield a conversation that the user does not want the communication partner to hear.

In the related art 1, the telephone body having dial keys and so on and the cradle for supporting the handset are integrated with each other. Further, in the related art 2, a telephone body is integrally incorporated in the cradle.

In the case of a fixed telephone set in which a telephone body and a cradle are integrated with each other like the related arts 1 and 2, since a loudspeaker is incorporated in the cradle, there have been instances where while making a hands-free telephone conversation, not requiring use of a handset, through a microphone and a loudspeaker of the telephone body, howling occurs due to these microphone and loudspeakers to make it difficult to hear the conversation. Further, there have also been instances where heat is generated from semiconductors and so on mounted in the telephone body during a call and this heat is transferred to the handset placed on the cradle, thus giving an unpleasant feeling to a user when using the handset due to its temperature rise. That is, in the conventional fixed telephone set, no consideration is given to the problem of howling or the problem of temperature rise of the handset that occurs when the cradle and the telephone body are integrated with each other.

Further, in the manufacture of fixed telephone sets of types in which a telephone body and a cradle are integrated with each other, it is necessary to prepare molds and associated parts corresponding to all the types of fixed telephone sets, respectively. Therefore, there is a drawback that when changing the type, the function, or the like, it is necessary to newly prepare a mold and associated parts for use in manufacturing an intended fixed telephone set and thus it is not possible to flexibly cope with the change in type or the like. Further, it is also not possible to change the external appearance of a fixed telephone set according to the taste of a user.

SUMMARY OF THE INVENTION

It is therefore an exemplary object of this invention to provide a fixed telephone set that can solve the problem of howling or the problem of temperature rise of a handset that occurs during a call.

It is another object of this invention to provide a fixed telephone set that allows changing its external appearance according to the taste of a user.

According to an exemplary aspect of this invention, there is provided a fixed telephone set comprising a telephone body and a cradle, wherein the cradle and the telephone body are configured to be separable from and couplable to each other and, when coupling, the cradle and the telephone body are coupled to each other with a space interposed therebetween.

The telephone body may be provided on a side surface of the cradle. A projection for receiving the rib may be provided on a side surface of the telephone body.

A recessed portion defining the space may be provided on a side surface of the cradle.

The cradle may be any one of cradles having mutually different functions.

The cradle and the telephone body may be acoustically and thermally isolated from each other by a side surface defining the space.

The telephone body may comprise a display portion and the display portion is replaceable. The telephone body may further comprise a key portion and the key portion is replaceable.

DESCRIPTION OF THE PREFERRED EMBODIMENTS

Hereinbelow, an embodiment of this invention will be described with reference to the drawings.

Figure 1:
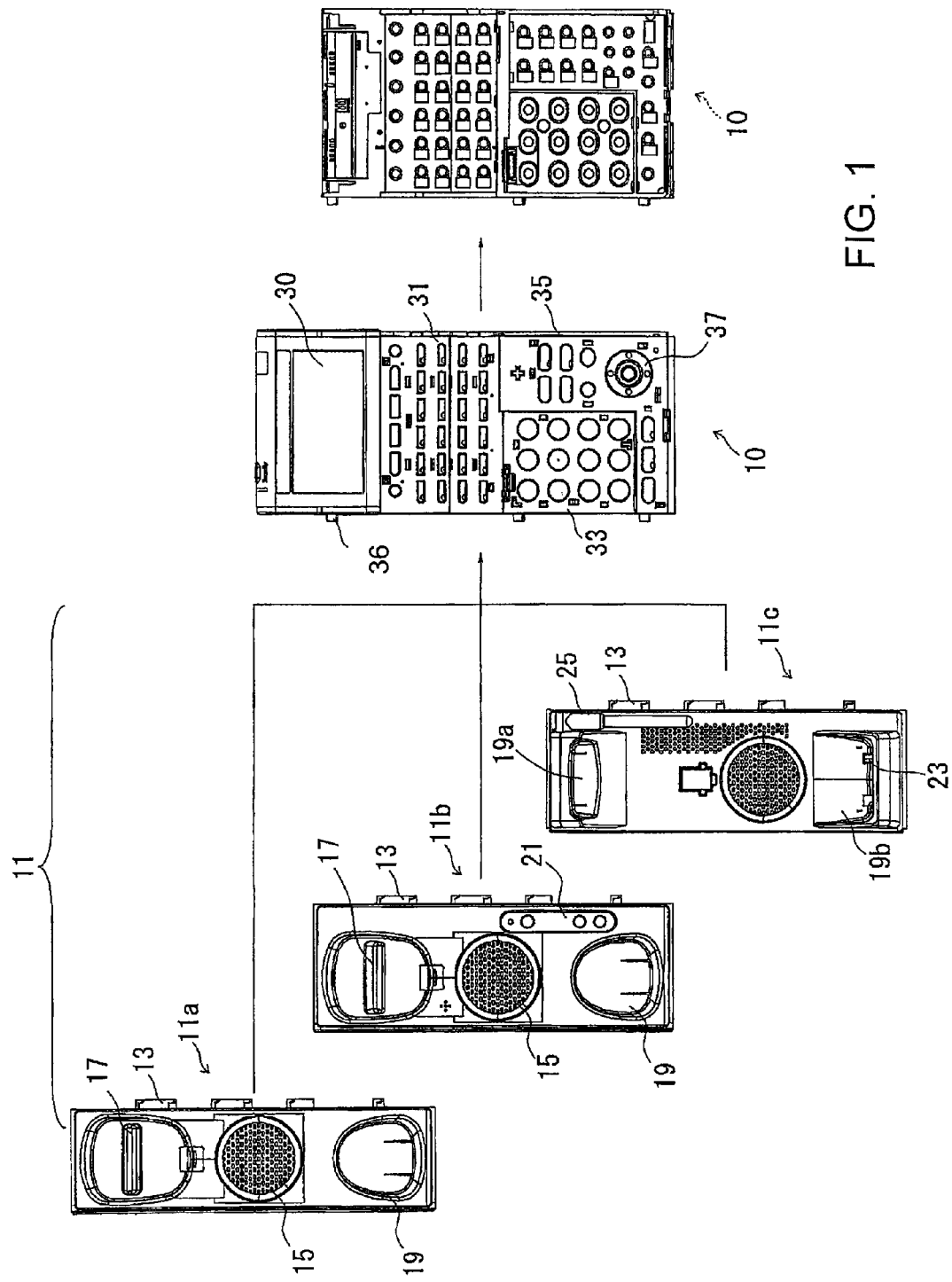
FIG. 1 is an exploded view showing the structure of a fixed telephone set according to this invention.

Referring to FIG. 1, a fixed telephone set according to the embodiment of this invention comprises a telephone body 10 and a cradle 11 provided separately from the telephone body 10 and attachable or couplable to the telephone body 10.

The illustrated cradle 11 may selectively be one of three types of cradles 11a, 11b, and 11c. The cradles 11a to 11c are each provided on its right side surface with ribs 13 for coupling to the telephone body 10.

On a left side surface of the telephone body 10, projections 36 are provided for receiving the coupling ribs 13 of each of the cradles 11a to 11c.

The cradle 11a has a loudspeaker 15 provided in the longitudinally central part thereof, a hook switch 17 provided in the longitudinally upper part thereof, and a handset receiving portion 19 provided in the longitudinally lower part thereof.

The cradle 11b has, like the cradle 11a, a loudspeaker 15, a hook switch 17, and a handset receiving portion 19 and further has a line switch 21 on the right side of the loudspeaker 15 and the handset receiving portion 19.

The cradle 11c is a cordless cradle and has handset receiving portions 19a and 19b in the longitudinally upper and lower parts thereof, respectively. Further, charging terminals 23 are provided on the lower-part handset receiving portion 19b and an antenna 25 is provided on the right side of the upper-part handset receiving portion 19a.

The coupling ribs 13 of the cradles 11a to 11c are arranged at the same intervals and have the same sizes so that any one of the cradles 11a to 11c can be coupled to the projections 36 of the telephone body 10 and the coupled cradle 11a, 11b, or 11c can be detached from the telephone body 10.

On the other hand, the telephone body 10 has, in addition to the projections 36 for receiving the coupling ribs 13 of each of the cradles 11a to 11c, a display portion 30, a line key portion 31, a dial key portion 33, and a function key portion 35. The illustrated function key portion 35 also includes cursor keys 37.

Herein, the display portion 30, the line key portion 31, the dial key portion 33, and the function key portion 35 of the telephone body 10 are replaceable, respectively. At the right end of FIG. 1, there is shown the telephone body 10 in a state where the display portion 30, the line key portion 31, the dial key portion 33, and the function key portion 35 are removed.

Therefore, the telephone body 10 according to this invention can be attached with another display portion 30, another line key portion 31, another dial key portion 33, and another function key portion 35 each having an external appearance different from that of the previous one and thus it is possible to form the telephone body 10 with key arrangements and colors according to the taste of a user.

Figure 2:
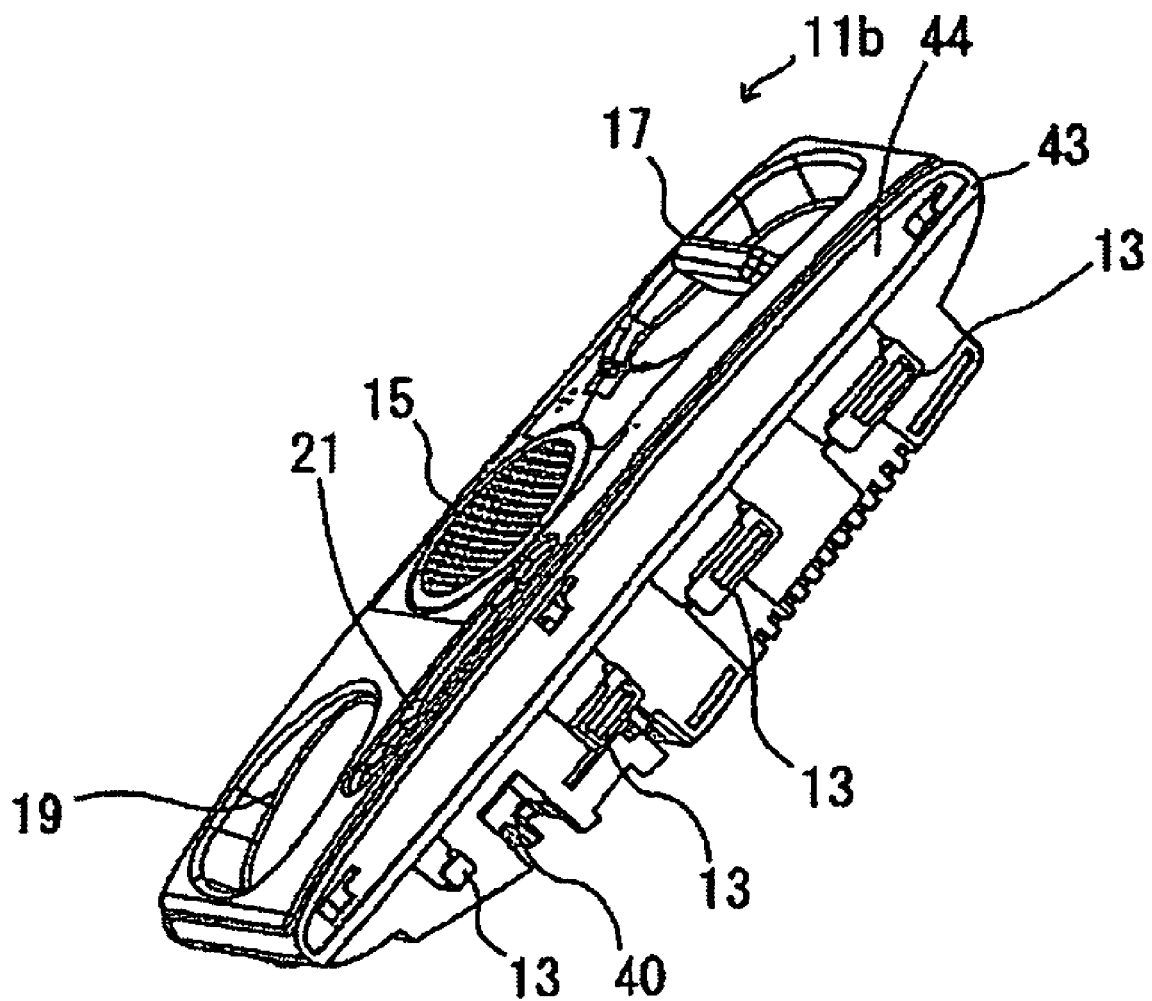
FIG. 2 is a perspective view for explaining in detail a cradle shown in FIG. 1.

Referring to FIG. 2, there is shown a specific example of the cradle 11b. As illustrated, in the lower part of one side surface of the cradle 11b, four ribs 13 are disposed at predetermined intervals in the longitudinal direction of the cradle 11b and a terminal portion 40 is provided for connection to the telephone body 10. Further, as in FIG. 1, a hook switch 17, a loudspeaker 15, a handset receiving portion 19, and a line switch 21 are provided on an upper surface of the cradle 11b.

In the upper part of the side surface on the upper side of the lower part of the side surface of the cradle 11b, there is provided a concave or recessed portion 44 bordered by a frame portion 43. The inside of the cradle 11b is closed by its side surface including the recessed portion 44.

Herein, when the illustrated cradle 11b is coupled to the telephone body 10, the frame portion 43 of the cradle 11b is brought into contact with the side surface of the telephone body 10 so that the recessed portion 44 forms a space between the telephone body 10 and the cradle 11b. The depth of the recessed portion 44 is set to about 1 mm.

As described above, by providing the recessed portion 44 on the side surface of the cradle 11b so as to form the space of about 1 mm between the cradle 11b and the telephone body 10 when the cradle 11b is coupled to the telephone body 10, the cradle 11b can be acoustically shielded or isolated from the telephone body 10 and further can be thermally shielded or isolated from the telephone body 10.

In this manner, by acoustically and thermally shielding the cradle 11b and the telephone body 10 from each other by means of the space, it is possible to prevent the occurrence of howling otherwise caused by a sound coming from a handset and further to prevent heating of the handset otherwise caused by heat coming from the telephone body 10.

Therefore, to couple the cradle 11b to the telephone body 10 with the space interposed therebetween is the extremely important structure for achieving acoustic and thermal shielding between the cradle 11b and the telephone body 10.

While the description has been made of the cradle 11b as an example in FIG. 2, the same, i.e. to provide a recessed portion 44 on one side surface of a cradle and to couple the cradle to the telephone body 10 with a space interposed therebetween, also applies to the other cradles 11a and 11c.

Hereinbelow, modes of this invention will be listed.

According to the first mode of this invention, there is obtained a fixed telephone set comprising a telephone body and a cradle, wherein the cradle and the telephone body are configured to be separable from and couplable to each other and, when coupling, the cradle and the telephone body are coupled to each other with a space interposed therebetween.

According to the second mode of this invention, in the first mode, there is obtained a fixed telephone set wherein a rib for coupling to the telephone body is provided on a side surface of the cradle.

According to the third mode of this invention, in the second mode, there is obtained a fixed telephone set wherein a projection for receiving the rib is provided on a side surface of the telephone body.

According to the fourth mode of this invention, in any of the first to third modes, there is obtained a fixed telephone set wherein a recessed portion defining the space is provided on a side surface of the cradle.

According to the fifth mode of this invention, in any of the first to fourth modes, there is obtained a fixed telephone set wherein the cradle is any one of cradles having mutually different functions.

According to the sixth mode of this invention, in any of the first to fifth modes, there is obtained a fixed telephone set wherein the cradle and the telephone body are acoustically and thermally isolated from each other by a side surface defining the space.

According to the seventh mode of this invention, in any of the first to sixth modes, there is obtained a fixed telephone set wherein the telephone body comprises a display portion and the display portion is replaceable.

According to the eighth mode of this invention, in the seventh mode, there is obtained a fixed telephone set wherein the telephone body further comprises a key portion and the key portion is replaceable.

As described above, this invention achieves the fixed telephone set configured such that the cradle and the telephone body are mechanically separated from each other and, when coupling, the cradle and the telephone body are coupled to each other with the space interposed therebetween. This makes it possible to prevent the occurrence of acoustic disadvantage such as howling. Further, by configuring the respective components of the telephone body to be replaceable, it is possible to change the external appearance of the fixed telephone set according to the taste of a user.

While the description has been made of the case where the recessed portion is provided on the cradle side in the foregoing embodiment, this invention is by no means limited thereto and is also applicable to a structure in which a recessed portion is provided on the telephone body side. Further, although the description has been made of the case where various key portions of the telephone body are replaceable in the foregoing embodiment, it is also possible to configure various other components of the telephone body to be replaceable.

What is claimed is:

1. A fixed telephone set comprising a telephone body and a cradle, wherein said cradle and said telephone body are configured to be separable from and couplable to each other;
   wherein a recessed portion defining a space is provided on a side surface of said cradle, said side surface facing a side surface of said telephone body; and wherein when coupling, said cradle and said telephone body are coupled to each other with said space interposed therebetween.

2. The fixed telephone set according to claim 1, wherein a rib for coupling to said telephone body is provided on a side surface of said cradle.

3. The fixed telephone set according to claim 2, wherein a projection for receiving said rib is provided on a side surface of said telephone body.

4. The fixed telephone set according to claim 1, wherein said cradle is any one of cradles having mutually different functions.

5. The fixed telephone set according to claim 1, wherein said cradle and said telephone body are acoustically and thermally isolated from each other by said recessed portion defining said space.

6. The fixed telephone set according to claim 1, wherein said telephone body comprises a display portion and said display portion is replaceable.

7. The fixed telephone set according to claim 6, wherein said telephone body further comprises a key portion and said key portion is replaceable.

* * * * *